US011851942B2

(12) United States Patent
Hibbs et al.

(10) Patent No.: US 11,851,942 B2
(45) Date of Patent: Dec. 26, 2023

(54) HIGH PERFORMANCE ACOUSTIC DOOR

(71) Applicant: V-T Industries Inc., Holstein, IA (US)

(72) Inventors: Daniel L Hibbs, Conrath, WI (US); Mike Miller, Appleton, WI (US); Thomas E. Harris, New London, WI (US); Aron Fleischmann, Huxley, IA (US)

(73) Assignee: V-T INDUSTRIES INC., Holstein, IA (US)

(*) Notice: Subject to any disclaimer, the term of this patent is extended or adjusted under 35 U.S.C. 154(b) by 300 days.

(21) Appl. No.: 17/319,821

(22) Filed: May 13, 2021

(65) Prior Publication Data

US 2021/0355749 A1 Nov. 18, 2021

Related U.S. Application Data

(60) Provisional application No. 63/024,335, filed on May 13, 2020.

(51) Int. Cl.
*E06B 5/20* (2006.01)
*B32B 21/08* (2006.01)
(Continued)

(52) U.S. Cl.
CPC .......... *E06B 5/20* (2013.01); *B32B 5/18* (2013.01); *B32B 5/245* (2013.01); *B32B 19/047* (2013.01);
(Continued)

(58) Field of Classification Search
CPC ........... E06B 3/7001; E06B 3/7015; E06B 2003/7023; E06B 2003/7025;
(Continued)

(56) References Cited

U.S. PATENT DOCUMENTS 4,489,121 A * 12/1984 Luckanuck ............. B32B 21/13
428/326
5,416,285 A * 5/1995 Niehaus .................... E06B 5/20
181/290
(Continued)

FOREIGN PATENT DOCUMENTS

CN 109555440 A * 4/2019
CN 210032167 U 2/2020
(Continued)

OTHER PUBLICATIONS

Notification of Transmittal of the International search Report and the Written Opinion of the International Searching Authority, or the Declaration dated Sep. 2, 2021 for App. No. PCT/US21/32277.

*Primary Examiner* — Ryan D Kwiecinski
(74) *Attorney, Agent, or Firm* — Ryan T. Grace; Advent, LLP

(57) ABSTRACT

An acoustic door assembly having 1¾" thickness, a sound transmission class (STC) rating greater than 50, UL10C 20-minute fire rating, and constructed without sheet metal or lead. In an embodiment, the door assembly includes a frame housing a decoupled internal core sandwiched between two mass-loaded vinyl outer faces. The internal core includes a multi-layering of low-density layers for absorbing high-frequency noise, damping layers of mass-loaded vinyl for absorbing low-frequency noise, and a flame-retardant layer. The outer faces are a multi-layered assembly coupled to a frame of the door assembly and in contact communication to the internal core, the outer faces having layers of mass-loaded vinyl, plywood, high-density fiberboard, and a veneer.

20 Claims, 3 Drawing Sheets

SECTION A-A

(51) Int. Cl.
  *B32B 27/06* (2006.01)
  *B32B 27/30* (2006.01)
  *B32B 21/04* (2006.01)
  *B32B 27/12* (2006.01)
  *B32B 5/18* (2006.01)
  *B32B 19/04* (2006.01)
  *B32B 5/24* (2006.01)

(52) U.S. Cl.
  CPC ............ *B32B 21/042* (2013.01); *B32B 21/08* (2013.01); *B32B 27/065* (2013.01); *B32B 27/12* (2013.01); *B32B 27/30* (2013.01); *B32B 27/302* (2013.01); *B32B 2307/102* (2013.01); *B32B 2307/3065* (2013.01); *B32B 2307/72* (2013.01); *B32B 2307/732* (2013.01)

(58) Field of Classification Search
  CPC ....... E06B 2003/7032; E06B 2003/704; E06B 2003/7042; E06B 2003/7051; E06B 2003/7061; E06B 5/16; E06B 5/20
  See application file for complete search history.

(56) References Cited

U.S. PATENT DOCUMENTS

| | | | |
|---|---|---|---|
| 5,723,831 A | 3/1998 | Martin et al. | |
| 8,074,766 B1* | 12/2011 | Shore | E04B 1/86 |
| | | | 181/290 |
| 8,141,417 B2 | 3/2012 | Gibson et al. | |
| 8,573,357 B1* | 11/2013 | Hibbs | E06B 5/20 |
| | | | 181/290 |
| 9,051,731 B2* | 6/2015 | Thomas | B32B 27/40 |
| 9,683,405 B2* | 6/2017 | Sadeli | E06B 3/7001 |
| 10,378,273 B2* | 8/2019 | Wang | E04B 1/86 |
| 10,435,941 B2* | 10/2019 | Daniels | B29C 48/07 |
| 2015/0089889 A1* | 4/2015 | Daniels | C04B 20/0048 |
| | | | 52/784.15 |
| 2017/0030140 A1* | 2/2017 | Nelson | E06B 3/72 |
| 2022/0186553 A1* | 6/2022 | Wasniewski | B32B 5/02 |

FOREIGN PATENT DOCUMENTS

| | | | | |
|---|---|---|---|---|
| EP | 513605 A1 * | 11/1992 | ............ | E06B 3/825 |
| EP | 2837767 A1 * | 2/2015 | ........... | E06B 3/7015 |

* cited by examiner

SECTION A-A ary, the intention is to cover all modifications, equivalents, and alternatives falling within the spirit and scope of the process of the present application as defined by the appended claims.

HIGH PERFORMANCE ACOUSTIC DOOR

CROSS-REFERENCE TO RELATED APPLICATIONS

The present application claims priority under 35 U.S.C. § 119(e) of U.S. Provisional Application Ser. No. 63/024,335, filed May 13, 2020, and titled "High Performance Acoustic Door."

BACKGROUND

Noise is a common problem considered for facility construction. For example, it is generally desired for apartments, hotels, schools, workspaces, and recording studios to have soundproof rooms that inhibit sound transmission so as to maintain the privacy of the occupants and to not distract or annoy neighbors. Sound has several modes of entry into a room, with the most common being through the walls, floor, and ceiling of the room, and specially designed materials are employed to dampen or reflect sound passing through these features. In some instances, further soundproofing of these rooms can be just a matter of increasing the thickness of these features. However, some room devices like windows, ventilation systems, and doors require further ingenuity for soundproofing since it is desired to preserve their original respective functions of passing light, air, and persons into the room, and in some situations, these devices are dimensionally constrained.

Acoustic doors are designed to prevent a specific amount of sound from passing through the door. Sound attenuation performance through materials is measured according to the American Society for Testing and Materials (ATM) under the standards highlighted under ASTM E-90 (laboratory measurement of airborne sound transmission loss of building partitions and elements) and E-413 (classification for rating sound insulation), and the materials are designated with a single numeric value known as the Sound Transmission Class (STC) rating. Generally speaking, the STC performance ranges can be divided into three performance categories: low (<35 STC), medium (STC 35-STC 45), and high (>STC 45).

DRAWINGS

The Detailed Description is described with reference to the accompanying figures. The use of the same reference numbers in different instances in the description and the figures may indicate similar or identical items. Additionally, it will be appreciated by those of ordinary skill in the art that the concepts disclosed herein are applicable to other door constructions.

Figure 1:
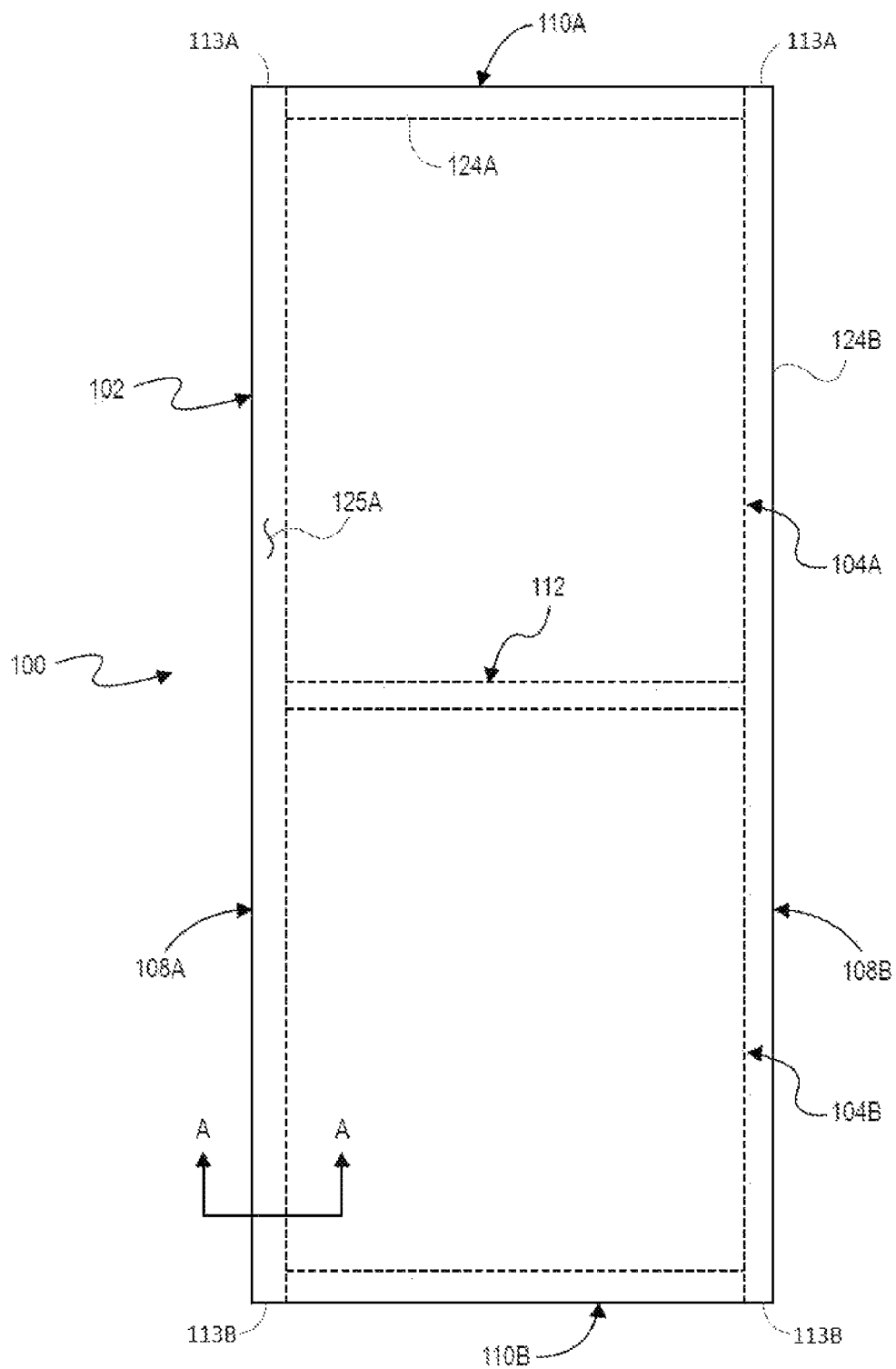
FIG. 1 is a front view of a door assembly, in accordance with an embodiment of the present disclosure.

While the embodiments of the present application are susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope.

As used herein, "system" and "assembly" are used interchangeably. It should be noted that the articles "a," "an," and "the," as used in this specification, include plural referents unless the content clearly dictates otherwise. Additional features and functions are illustrated and discussed below. Furthermore, as used herein, a number succeeded by an end quote (e.g., X") indicates a quantity described in inches.

Overview

A standard door can have dimensions that range from 24" to 36" in width and about 80" in height. Standard door thickness can start at 1⅜", though if the door is taller than 80" or wider than 36", the recommended thickness by building construction codes increases to 1¾". Thus, 1¾" thickness is generally the standard to the commercial and architectural wood door communities. Thicknesses such as 2¼" and others are available; however, these are less desirable and typically require non-standard accommodations such as frames and hardware—staying within 1¾" is not only a design constraint but is also a key element to market acceptance. Because of these desired dimension requirements, it is desired to engineer a door that has the standard 1¾" thickness while also having a high (>45) STC rating. Typically for a wood door to perform at a high STC rating while maintaining the desired dimension requirement, the construction includes either lead or sheet metal designed into the faces of the door.

While lead is highly effective for acoustic performance and is a preferred material for particular applications such as radiation protection, the use of lead in acoustic doors requires special care and handling not only at the time of manufacture but also at the time of disposal due to environmental control and regulations, thus lead is becoming less accepted in the market where alternative solutions are available.

On the other hand, sheet metal, being also effective for acoustic performance, presents a material cost and manufacturing hazard. For a manufacturing facility that produces wood doors, any sparking created by sheet metal cutting, whether intentional or not, can have catastrophic consequences should the sparks come in contact with any flammable particulate matter such as sawdust—a common waste product found at these facilities. For this reason, extra precautions and separated workspaces are required, which subsequently lead to additional manufacturing costs.

The present disclosure is directed to a high-performing acoustic door assembly (henceforth simply referred to as "door assembly") that is 1¾" in thickness, primarily designed and manufactured for the architectural wood door market. The door assembly has an STC value of STC 50 and above, is designed for a UL10C 20-minute fire rating, and is constructed without having sheet metal or lead. Thus, the present door assembly is capable of reducing manufacturing costs, avoids manufacturing risks, and reduces environmental impact while maintaining a high STC rating with a 1¾" thickness requirement.

The door assembly includes a decoupled internal core sandwiched between two mass-loaded vinyl outer faces. The internal core includes a layering of a planar layer that rests on a low-density region of a multi-density, formed fibrous panel, which itself is adjacent to a damping layer of mass-loaded vinyl. This damping layer is one of two outermost layers of the internal core. Additionally, the internal core layering contains at least one fibrous, decoupling layer which is located on the planar layer and serves as a high-temperature insulative (i.e., fire retardant) layer to permit a 20-minute fire test. The internal core is contained within the door assembly using a frame. In embodiments, the frame is comprised of, but not limited to, structural composite lumber (SCL).

The frame contains two stiles, two end-rails, and at least one mid-rail. The frame inherently creates two pockets for which the internal core components are positioned; however, it should be appreciated to those knowledgeable in the art of door construction that a plurality of mid-rails may be employed, thereby creating three or more pockets for housing internal core components.

The outer faces are multi-layered assemblies that are applied to the frame. The faces contain a thin layer of crossband adjacent to a layer of high specific gravity, mass-loaded material such as vinyl. A crossband layer of high-density fiberboard (HDF) is applied to an outer side of the high specific gravity material, and a final layer is applied to the crossband layer as a decorative layer. The final layer can be a wood veneer, a decorative laminate, or any other decorative covering. Details describing the layering configuration and construction of the door assembly are described further with respect to the embodiments and figures herein.

Example Embodiments

Figure 2:
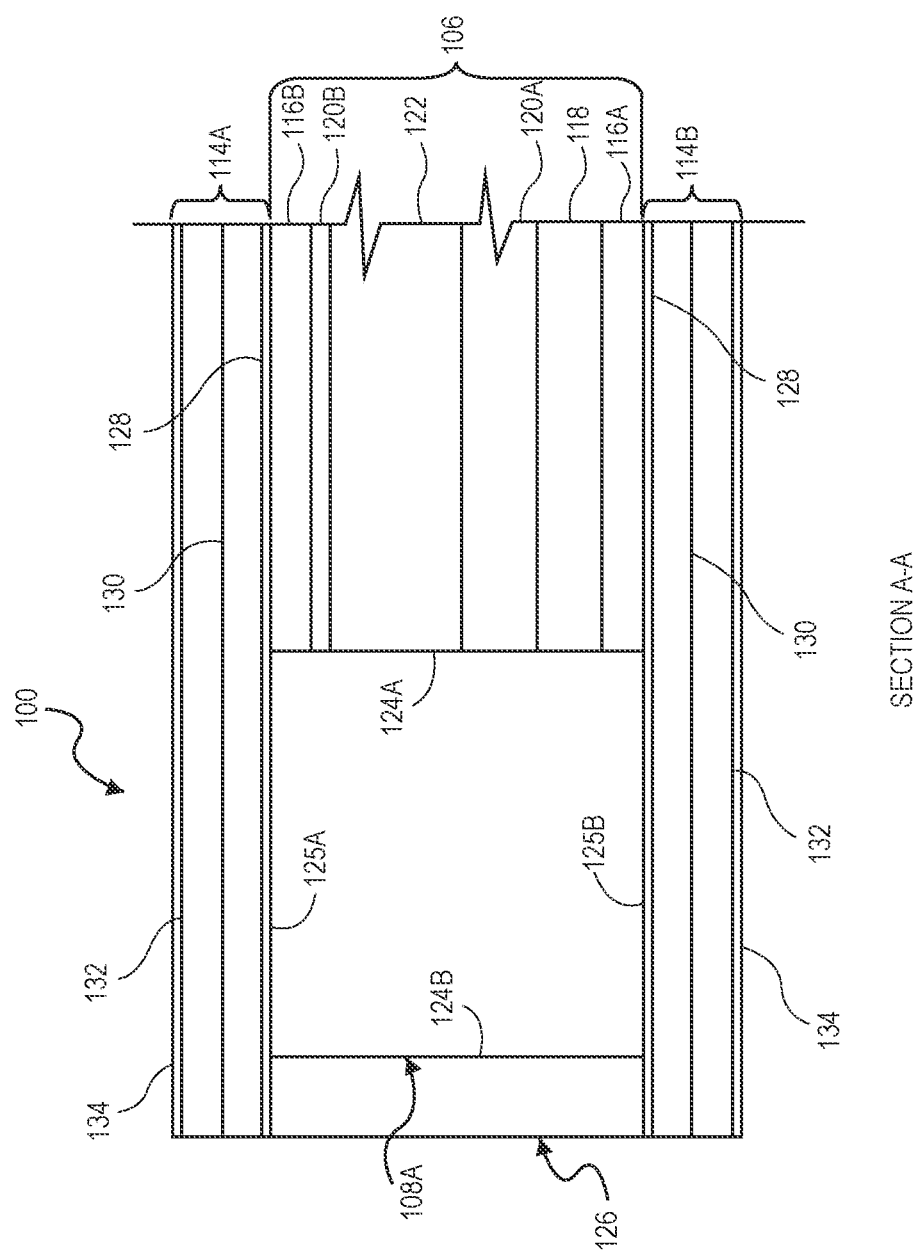
FIG. 2 is a cross-section view of the door assembly of FIG. 1 to illustrate a layering of an internal core and outer faces of the door assembly, in accordance with an embodiment of the present disclosure.

FIG. 1 is a front view of door assembly 100, in accordance with an embodiment of the present disclosure. In general, door assembly 100 includes frame 102 that serves as structural support for door assembly 100. Frame 102 includes two stiles, two end-rails, and one or more mid-rails. In this figure, stile 108a and stile 108b, each having opposing ends 113a and 113b, are positioned parallel to each other with respective ends of each stile also being in parallel. In other words, end 113a of stile 108a is parallel to end 113a of stile 108b, and end 113b of stile 108a is parallel to end 113b of stile 108b. Furthermore, end-rails 110a-b each couple stiles 108a-b at a respective end of the stiles, with end-rail 110a coupling stiles 108a-b at, adjacent, or proximate to end 113a of each stile, and end rail 110b coupling stiles 108a-b at or proximate to end 113b of each stile. In general, one or more mid-rails couple stiles 108a-b wherein the one or more mid-rails are positioned between end rails 110a-b. As a result of the configuration of frame 102, two or more pockets are formed by the components of frame 102. In this figure, pocket 104a is formed by the boundary defined by stiles 108a-b, end-rail 110a, and mid-rail 112, and pocket 104b is formed by the boundary defined by stiles 108a-b, end-rail 110b, and mid-rail 112. As illustrated in FIG. 2, the configuration of frame 102 results in inner frame surface 124a and outer frame surface 124b, wherein inner frame surface 124a is a proximate surface towards pockets 104a-b such that internal core 106 is in contact communication with inner frame surface 124a, and wherein outer frame surface 124b is a distal (opposing) surface relative to inner frame surface 124a. Furthermore, frame 102 has faces 125a-b that are planar surfaces that are oriented parallel to layers of internal core 106 (further illustrated with respect to FIG. 2). In embodiments, the frame is comprised of, but not limited to, structural composite lumber (SCL).

Figure 3:
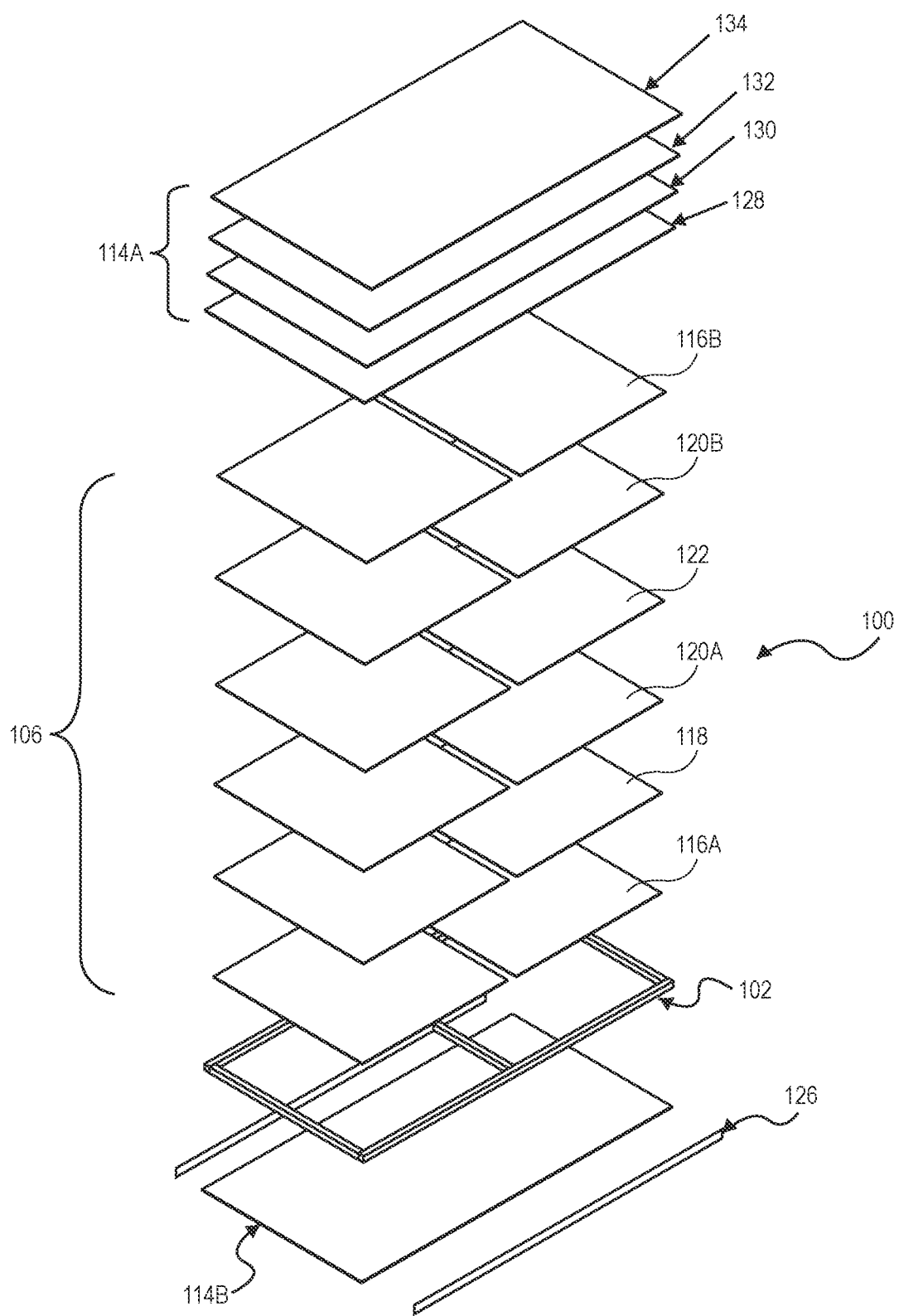
FIG. 3 is a perspective exploded view of the door assembly of FIG. 1 illustrating the layering of the internal core and the outer faces of the door assembly, in accordance with an embodiment of the present disclosure.

Referring now to FIG. 2 and FIG. 3, wherein FIG. 2 depicts a cross-section A-A of door assembly 100 of FIG. 1 detailing a layering of internal core 106 and outer faces 114a-b, and wherein FIG. 3 depicts a perspective exploded view of the layering of internal core 106 and outer faces 114a-b of the door assembly of FIG. 1.

In general, internal core 106 has decoupled layers such that each layer is only in contact communication with each adjacent layer and frame 102. Furthermore, internal core 106 is also decoupled from outer faces 114a-b. As shown in FIG. 2 and FIG. 3, layering of internal core 106 includes (in order of adjacency) layer 116a comprising of mass-loaded vinyl, layer 118 comprising of a natural fiber mat that contains areas of varying density, layer 120a comprising of polystyrene foam, layer 122 comprising of ½" thick of a flame retardant material (e.g., high-temperature fiberglass, mineral wool insulation, etc.), layer 120b comprising of polystyrene foam, and layer 116b comprising of mass-loaded vinyl. While FIG. 2 and FIG. 3 illustrates one example of the order of layers of internal core 106, it should be appreciated by those in the skill of the art that the layers of internal core 106 may be placed in any particular order.

In embodiments, layer 118 has varying density formed by a dimpling or a perforation pattern across layer 118.

In some embodiments, the mass-loaded vinyl used herein has a specific gravity ranging from 2.0 to 4.7 (ASTM D792), a weight per unit area ranging from 1.0 to 2.0 lb/ft$^2$, and a thickness ranging from 0.041" to 0.192".

As shown in FIG. 2 and FIG. 3, internal core 106 is contained by inner frame surface 124a within frame 102, and hardwood edging 126 is coupled to outer frame surface 124b. In some embodiments, hardwood edging 126 is coupled only to outer frame surface 124b associated with stiles 108a-b (stile 108b not shown). Outer faces 114a-b are each coupled to respective faces 125a-b of frame 102, but not to internal core 106.

As shown in FIG. 2 and FIG. 3, outer faces 114a-b each include (in order of adjacency) layer 128 comprising of a crossband material measuring approximately ⅟₃₂" thick, layer 130 comprising of high specific gravity mass-loaded vinyl with a specific gravity measuring approximately half that of lead, layer 132 comprising of a high-density fiberboard (HDF) crossband measuring in 3 mm in thickness, and layer 134 being a veneer material measuring ⅟₄₂" in thickness. While FIG. 2 and FIG. 3 illustrates one example of the order of layers of outer faces 114a-b, it should be appreciated by those in the skill of the art that the layers of outer faces 114a-b may be placed in any particular order with the exception of the veneer layer (i.e., layer 134), wherein the veneer layer is a most distal layer of the layers of outer faces 114a-b relative to internal core 106.

In some embodiments, layer 130 has a thickness ranging from 0.041" to 0.192". For example, layer 130 can measure ⅛" in thickness. In some embodiments, layer 130 is the same material as layers 116a-b (i.e., mass-loaded vinyl). In embodiments, layer 134 can be a wood veneer, a decorative laminate, or any other decorative covering. In embodiments, layer 128 of each outer face 114a-b is coupled to face 125a-b of frame 102 by adhesion. Furthermore, layers 128-134 are each coupled to each adjacent layer by adhesion. In embodiments, the crossband material of layer 128 is plywood. In alternative embodiments, the crossband material is a synthetic crossband comprising of a wood-fiber veneer (e.g., Syn-Ply®).

A method to construct door assembly 100 is as follows:

Frame 102 is pre-assembled using hardwood edge-banded structural composite lumber for stiles 108a-b, and non-edge-banded structural lumber for end-rails 110a-b and mid-rail 112. Frame 102 is constructed as a function of the finished door size. Once frame 102 is constructed, the dimensions of pockets 104a-b where internal core 106 is located are known. Next, the layers of internal core 106 are cut to size based on the dimensions of pockets 104a-b and are set aside until the final door assembly process.

Outer faces 114a-b are also pre-assembled. First, the 1/42" veneer (i.e. layer 134) is placed on a press table, wherein a cosmetic surface of the veneer is positioned in contact with the press table. Next, the HDF crossband (i.e., layer 132) is glued and placed on a surface distal from the cosmetic surface of the veneer. Next, the high-specific gravity mass-loaded vinyl (i.e., layer 130) is glued and placed on the HDF crossband. Finally, a thin crossband (i.e. layer 128) is glued and placed on the high-specific gravity mass-loaded vinyl. This assembly layup is pressed together in a cold (i.e, room temperature) press until the glue has cured. This procedure provides a smooth, flat subassembly of outer faces 114a-b.

The door assembly is as follows. First, outer face 114a is placed on the press table with the cosmetic surface of the veneer in contact with the press table. Next, glue is applied to face 125a of frame 102 and is adhered to outer face 114a, with frame 102 in direct contact with the crossband (i.e., layer 128). Next, components of internal core 106 are placed within pockets 104a-b. Finally, glue is applied to face 125b of frame 102 and is adhered to outer face 114b, with frame 102 in direct contact with the cross band of outer face 114b. The assembly is cold-pressed until the glue has cured. The door assembly is then transferred for machining, final sanding, and finishing.

A method to install door assembly 100 can best be described as follows. The door assembly is constructed and machined as with wood doors common to the industry and therefore is installed and used in the same manner.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An acoustic door assembly, comprising:
a frame having an inner frame surface, an outer frame surface, a first face, a second face, and two or more pockets formed by the inner frame surface;
an internal core positioned within each of the two or more pockets, the internal core having decoupled layers, the decoupled layers including:
a first mass-loaded vinyl layer,
a natural fiber mat layer,
a polystyrene foam layer,
a flame retardant material layer,
a polystyrene foam layer, and
a second mass-loaded vinyl layer; and
a first outer face and a second outer face, the first outer face coupled to the first face of the frame, the second outer face coupled to the second face of the frame, each outer face being in contact communication with the decoupled internal core, each outer face having a plurality of coupled layers, the coupled layers including:
a crossband material layer,
a mass-loaded vinyl layer,
a high-density fiberboard (HDF) crossband layer, and
a veneer material layer, the veneer material layer being a most distal layer of the coupled layers relative to the internal core.

2. The assembly of claim 1, wherein the frame further comprises:
a first stile, a second stile, a first end-rail, a second end-rail, and one or more one mid-rails, the first stile and a second stile each having a respective first end and a second end, the first and second stile positioned parallel to each other with respective ends of each stile also being in parallel, the first ends of each stile being proximate to each other, the first end-rail coupled to the first and second stile at a position proximate to the first ends of each stile, the second end-rail coupled to the first and second stile at a position proximate to the second ends of each stile, and the one or more mid-rails coupled to the first and second stile, the one or more mid-rails positioned between the first and the second end-rails.

3. The assembly of claim 1, wherein the door assembly has a thickness of 1¾ inches.

4. The assembly of claim 3, wherein the flame retardant material layer has a thickness of ½ inches.

5. The assembly of claim 3, wherein the crossband material layer of the outer faces has a thickness of 1/32 inches.

6. The assembly of claim 3, wherein the mass-loaded vinyl layer of the outer faces has a thickness ranging from 0.041 inches to 0.192 inches.

7. The assembly of claim 6, wherein the mass-loaded vinyl layer of the outer faces has a specific gravity ranging from 2.0 to 4.7 (ASTM D792).

8. The assembly of claim 6, wherein the mass-loaded vinyl layer of the outer faces has a weight per unit area ranging from 1.0 to 2.0 lb/ft2.

9. The assembly of claim 3, wherein the first and second mass-loaded vinyl layers of the internal core each have a thickness ranging from 0.041 inches to 0.192 inches.

10. The assembly of claim 9, wherein the first and second mass-loaded vinyl layers of the internal core each have a specific gravity ranging from 2.0 to 4.7 (ASTM D792).

11. The assembly of claim 9, wherein the first and second mass-loaded vinyl layers of the internal core each have a weight per unit area ranging from 1.0 to 2.0 lb/ft2.

12. The assembly of claim 3, the high-density fiberboard (HDF) crossband layer has a thickness of 3 millimeters.

13. The assembly of claim 3, wherein the veneer material layer has a thickness of 1/42 inches.

14. The assembly of claim 1, wherein the natural fiber mat layer has areas of varying density.

15. The assembly of claim 1, wherein the crossband material layer of the outer faces is plywood.

16. The assembly of claim 1, wherein the crossband material layer of the outer faces is a synthetic crossband including a wood-fiber veneer.

17. The assembly of claim 1, wherein the flame retardant material layer is high-temperature fiberglass.

18. The assembly of claim 1, wherein the flame retardant material layer is mineral wool insulation.

19. An acoustic door assembly, comprising:
a frame having an inner frame surface, an outer frame surface, a first face, a second face, and two or more pockets formed by the inner frame surface;
an internal core positioned within each of the two or more pockets, the internal core having decoupled layers, the decoupled layers including, in order of adjacency:
a first layer of mass-loaded vinyl,
a second layer of natural fiber mat,
a third layer of polystyrene foam,
a fourth layer of flame retardant material,
a fifth layer of polystyrene foam, and
a sixth layer of mass-loaded vinyl; and
a first outer face and a second outer face, the first outer face coupled to the first face of the frame, the second outer face coupled to the second face of the frame, each outer face being in contact communication with the decoupled internal core, each outer face having a plurality of coupled layers, the coupled layers including, in order of adjacency:
a first layer of crossband material,
a second layer of mass-loaded vinyl,
a third layer of high-density fiberboard (HDF) crossband material, and
a fourth layer of veneer material, the fourth layer being a most distal layer of the coupled layers relative to the internal core.

20. An acoustic door assembly, comprising:
a frame having an inner frame surface, an outer frame surface, a first face, a second face, and two or more pockets formed by the inner frame surface;
an internal core positioned within each of the two or more pockets, the internal core having decoupled layers, the decoupled layers including:
a mass-loaded vinyl layer,
a first polystyrene foam layer,
a second polystyrene foam layer, the first polystyrene foam layer and the second polystyrene foam layer separated from each other by at least another layer;
a first outer face and a second outer face, the first outer face coupled to the first face of the frame, the second outer face coupled to the second face of the frame, each outer face being in contact communication with the decoupled internal core, each outer face having a plurality of coupled layers, the coupled layers including at least: a crossband material layer, a mass-loaded vinyl layer, a high-density fiberboard (HDF) crossband material layer, and a veneer material layer.

\* \* \* \* \*